June 12, 1928.

W. S. TOPPER 1,673,427

NONSKID DEVICE FOR PNEUMATIC TIRES

Filed Oct. 24, 1925

INVENTOR.
William S. Topper

ATTORNEY.

Patented June 12, 1928.

1,673,427

UNITED STATES PATENT OFFICE.

WILLIAM S. TOPPER, OF BUCYRUS, OHIO.

NONSKID DEVICE FOR PNEUMATIC TIRES.

Application filed October 24, 1925. Serial No. 64,632.

The present invention has for its purpose to provide an improved non-skid device which is as serviceable when encountering mud and slushy ice as it is when encountering hard ice roadways, the non-skid device having lugs to prevent skidding in the direction of rotation of the wheel, together with angularly disposed lugs to prevent transverse slipping, and since the entire device is constructed of metal, it is durable and efficient in use.

Another purpose is to provide a non-skid device which is capable of location on the wheel at points adjacent the spokes thereof, thereby preventing creeping of the device relative to the tire of the wheel.

Still another purpose is to provide an improved hook or connector for uniting a pair of short chains, one extending from each side of the non-skid shoe.

It is to be understood that the particulars herein given are in no way limitative and that, while still keeping within the scope of the invention, any desired modifications of detail and desired proportions may be made in the device according to the circumstances.

The invention comprises further features and combinations of parts to be hereinafter set forth, shown in the drawings and claimed.

Figure 3:
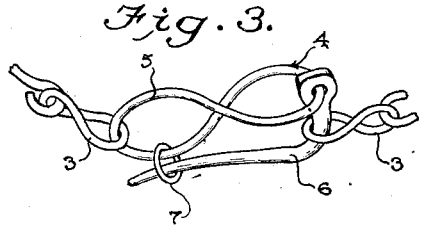
Figure 3 is an enlarged detail perspective view of the connector.

Referring to the drawings, 1 designates a band which extends over the tire in a position with its ends relatively close to the edges of the rim but not enough to cause the ends of the shoe to contact with the rim, provided the tire is depressed sufficiently for such purpose. The ends of the band have eyes 2 to which short chains 3 are connected. The chains extend partially under the rim of the wheel. One of the chains is provided with a connector comprising an 8-shaped link of which the loops 4 and 5 are disposed in planes at right angles to each other. The hook member 6 also comprising a part of the connector has a pivotal connection with the loop 4 and is adapted for insertion through the terminal link of one of the chains 3 with which it is held in engagement when the ring 7 carried by the loop 5 is engaged over the free end as clearly shown in Figure 3. The free extremity of the hook 6 is deflected outwardly and the adjacent portions of the loop 5 being deflected away from the free extremity of the hook, the ring 7 is normally held securely in engagement with the hook, thus preventing its disconnection from the terminal link of the chain 3 with which it is engaged.

The outer face of the band is provided with lugs 8 which prevent skidding of the wheel in the direction of rotation thereof. In other words, the lugs 8 are constructed with their lengths in the direction of the band. The band also has lugs 9 which are located adjacent the remote ends of the first lugs and are transverse of the band. These latter lugs prevent lateral skidding of the wheel.

Figure 1:
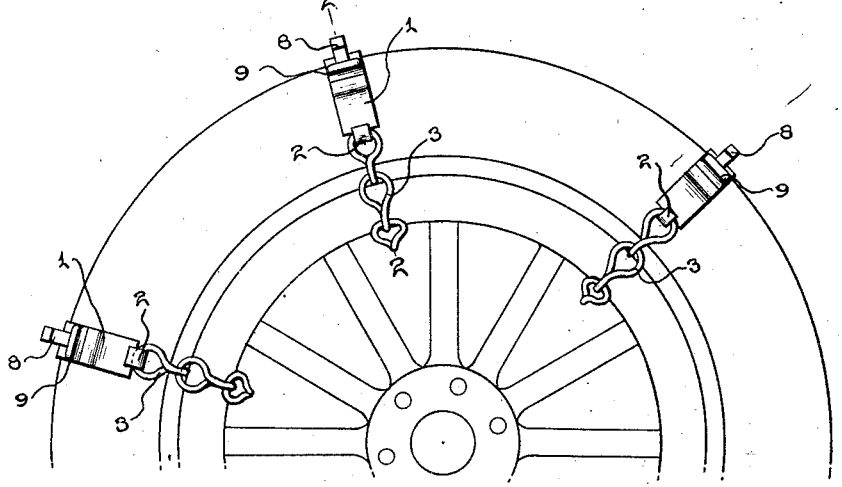
Figure 1 is a view in side elevation of a segment of an automobile wheel, showing a plurality of non-skid devices or shoes applied, for instance, three in number.
Figure 2:
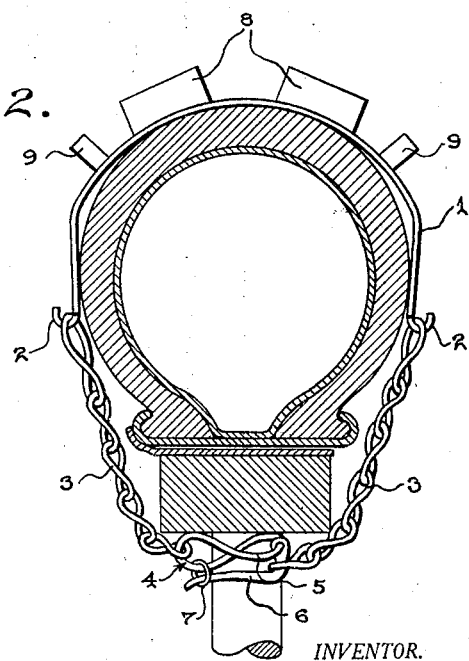
Figure 2 is a sectional view on line 2—2 of Figure 1, more clearly showing the construction of the shoe or device which is in the form of a band which extends over the tire, showing the short chains and the connector.
Figure 4:
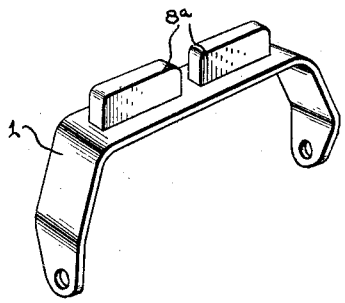
Figure 4 is an enlarged detail perspective view of a modified form of non-skid device or shoe which only has the lugs for preventing skidding of the tire in the direction of rotation.

In Figure 4, it will be noted that the transverse lugs 9 are eliminated, in which case the lugs $8^a$ are depended upon to prevent skidding of the wheel in the direction of its rotation and at the same time acting to prevent, to some extent, skidding laterally.

The invention having been set forth, what is claimed is:

A connector for the adjacent ends of a pair of flexible members, the same comprising an 8-shaped link of which the loops are disposed in planes at right angles to each other, a hook lever pivotally connected with one of said loops and having its free extremity disposed normally adjacent the other of said loops, and a locking ring carried by the last said loop and engageable over the free extremity of the hook lever.

In testimony whereof he affixes his signature.

WILLIAM S. TOPPER.